Jan. 16, 1951 L. P. FINLEY 2,538,448
TELESCOPING IMPLEMENT HITCH
Filed June 15, 1949
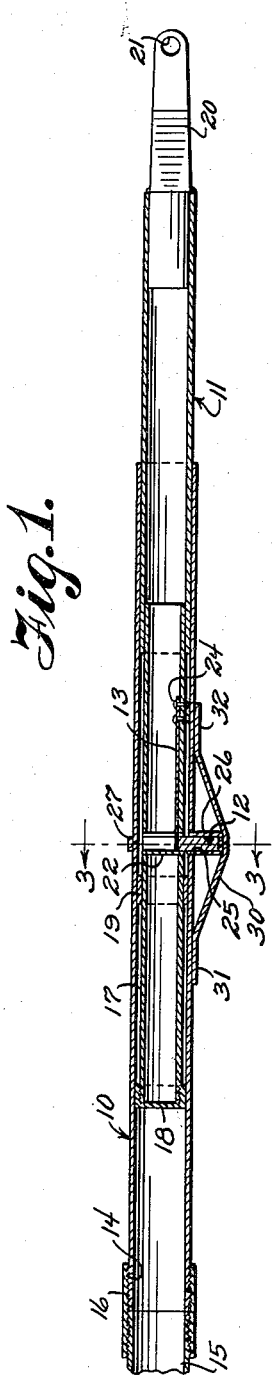
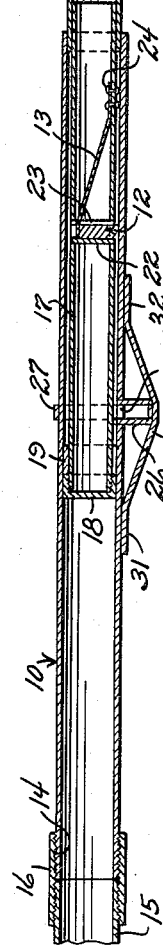
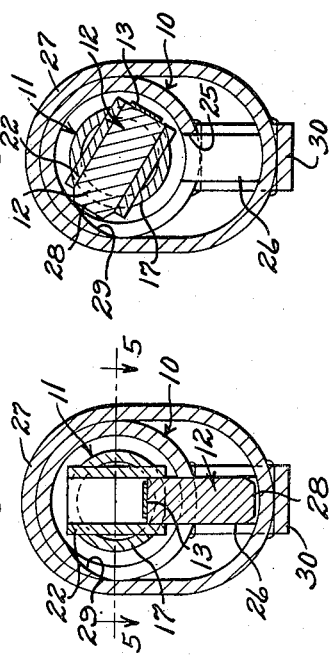
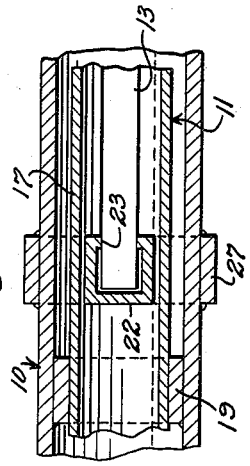
INVENTOR.
Lee P. Finley
BY Victor J. Evans & Co.
ATTORNEYS Patented Jan. 16, 1951

2,538,448

UNITED STATES PATENT OFFICE 2,538,448

TELESCOPING IMPLEMENT HITCH

Lee P. Finley, Ogdensburg, N. Y.

Application June 15, 1949, Serial No. 99,330

4 Claims. (Cl. 280—33.44)

1

This invention relates to a hitch particularly adapted for attaching farm wagons or other implements or equipment to a tractor, truck, or other vehicle, and in particular a hitch formed with telescoping tubular members with a latch for holding the members in a contracted position and in which one member may be rotated in relation to the other to release the latch.

The purpose of this invention is to provide a hitch for connecting an implement to the draw bar of a tractor that may be attached by a single operator and in which the tractor may be backed up to a point within one foot of the implement and the hitch extended to facilitate attaching the end thereof to the drawbar of the tractor.

Various types of hitches have been provided particularly for attaching implements and trailers, to tractors and motor vehicles but it is difficult for one man to install the hitch and it is also difficult to attach the hitch without moving either the tractor or the vehicle or implement. With this thought in mind this invention contemplates a hitch that is readily attached to the tongue of an implement and that may be readily extended to any suitable length so that an eye on the outer end may coincide with a bolt hole or the like in the drawbar of a tractor.

The object of this invention is, therefore, to provide means for forming a hitch so that the length thereof may be adjusted to facilitate attaching an implement to a tractor without moving either the implement or tractor.

Another object of the invention is to provide a hitch that is formed with telescoping members in which the members are locked by a latch in the collapsed position and in which one of the members may be rotated to release the latch when it is desired to extend the length of the hitch.

A further object of the invention is to provide an improved hitch in which one part may be slid out of the other for attaching an implement to a tractor, which is of a comparatively simple and economical construction.

With these and other objects and advantages in view the invention embodies a tubular base member having means on one end whereby it may be attached to the tongue of an implement, a tubular telescoping member slidable in the base member and having a connector on the outer end, and a spring actuated latch in the telescoping member positioned to snap into an opening in the base member to lock the telescoping member in relation to the base member.

Other features and advantages of the invention will appear from the following description taken in connection with the drawings wherein:

Figure 1 is a longitudinal section through the hitch showing the parts contracted and with the latch of the telescoping member in a socket of the base member.

Figure 2 is a similar view showing the parts extended with the latch released from the socket and with parts broken away.

Figure 3 is a cross section through the hitch on an enlarged scale taken on line 3—3 of Figure 1.

Figure 4 is a similar section showing the latch released from the socket wherein the telescoping member is rotated in relation to the base member.

Figure 5 is a detail showing a plan view of the latch, taken on line 5—5 of Figure 3 on an enlarged scale and with parts broken away.

Referring now to the drawings wherein like reference characters denote corresponding parts the unique one man telescoping implement hitch of this invention includes a tubular base member 10, a telescoping tube 11, and a latch 12 that is held by a spring 13.

As illustrated in the drawings the inner end of the base member 10 is provided with threads 14 by which it may be connected to a tongue 15 by a coupling 16. It will be understood, however, that the base member may be attached to the tongue or other part of an implement, trailer, or device by any suitable means.

The telescoping tube 11 is formed with an inner section 17 having a cap 18 threaded on the inner end and a collar 19 is provided in the base member 10 to provide a stop, to be engaged by the end of the cap 18 to limit outward movement of the telescoping member 11. The outer section of the telescoping tube 11 and also the cap 18 are slidably positioned in the tubular base member 10. A connector 20 with an opening 21 therein is carried by the outer end of the telescoping tube 11, as illustrated in Figures 1 and 2 and it will be understood that a connector of any suitable type may be provided.

The inner section 17 of the telescoping tube is provided with a transversely positioned tube 22 in which the latch 12 is positioned and a slot 23 is provided in one side of the tube 22 through which the end of the spring 13 extends. The opposite end of the spring is attached by rivets 24 or the like to the inner section of the telescoping tube as shown in Figure 2.

The tubular base member 10 is provided with a slot 25 that is positioned to receive the latch 12 and a square tubular socket 26 extends from the side of the base member and is positioned to register with one end of the slot 25. A band 27 extends around the tubular base member and over the end of the socket 26 as illustrated in Figures 3 and 4 and when the telescoping tube 11 is rotated with the base member 10 stationary the end 28 of the latch rides against the inner surface of the band 27 and also on an arcuate surface 29 of the base member 10 whereby the latch is forced into the base member 10 so that the telescoping tube 11 may be drawn outwardly as illustrated in Figure 2. The socket 26 is braced longitudinally by a strap 30 which is welded or otherwise attached to the outer end of the socket and positioned with the ends 31 and 32 thereof secured to the outer surface of the base member 10.

With the parts arranged in this manner the tubular base member 10 is attached to the tongue or other part of an implement or device and, with the tractor backed up to within one foot of the implement or device the telescoping tube 11 is turned until the latch 12 is released from the socket 26 and then the telescoping tube may be slid backward and forward until the connector at the outer end registers with a bolt hole or bolt of a clevis or other part of the drawbar of a tractor. The outer end of the hitch may, therefore, be attached to the tractor and then the tractor may be backed upwardly slightly until the latch snaps back into the socket. The device may be removed in the same manner whereby the tractor may readily be released.

It will be understood that modifications may be made in the design and arrangement of the parts without departing from the spirit of the invention.

What is claimed is:

1. An extensible hitch comprising a base member for attaching the hitch to an implement, a connector member longitudinally slidable in the base member and having a socket with an arcuate inner surface extended at one side thereof, a latch for securing the connector member in the base member and positioned to register with the socket of the base member with the connector member in the extended position, means resiliently retaining the latch in the latching position, said latch riding on the arcuate inner surface of the said socket of the base member releasing the connector member from the base member when one member is rotated in relation to the other, and said base member having means limiting outward movement of the connector member.

2. In a hitch, the combination which comprises a tubular base member, means attaching the said base member to an implement, a tubular telescoping member having a connector in the outer end and longitudinally slidable in the base member, said base member having a collar on the inner surface thereof, a cap on the inner end of the telescoping member positioned to engage the collar of the base member to limit outward movement of the telescoping member, a socket in one side of the base member, a latch in the telescoping member positioned to snap into the socket of the base member, and means on the base member for sliding the latch out of the socket as the telescoping member is rotated in the base member whereby the telescoping member is free to slide outwardly.

3. In a hitch, the combination which comprises a tubular base member, means attaching the said base member to an implement, a tubular telescoping member having a connector in the outer end and longitudinally slidable in the base member, said base member having a collar on the inner surface thereof, a cap on the inner end of the telescoping member positioned to engage the collar of the base member to limit outward movement of the telescoping member, a socket in one side of the base member, a latch in the telescoping member positioned to snap into the socket of the base member, resilient means in the telescoping member for urging the latch into the socket of the base member, and means on the base member for sliding the latch out of the socket as the telescoping member is rotated in the base member whereby the telescoping member is free to slide outwardly.

4. In a hitch, the combination which comprises a tubular base member, means attaching the said base member to an implement, a tubular telescoping member having a connector in the outer end and longitudinally slidable in the base member, said base member having a collar on the inner surface thereof, a cap on the inner end of the telescoping member positioned to engage the collar of the base member to limit outward movement of the telescoping member, a socket in one side of the base member, a latch in the telescoping member positioned to snap into the socket of the base member, a spring for resiliently urging the latch into the socket of the base member, and means on the base member for sliding the latch out of the socket as the telescoping member is rotated in the base member whereby the telescoping member is free to slide outwardly.

LEE P. FINLEY.

REFERENCES CITED

The following references are of record in the file of this patent:

UNITED STATES PATENTS

| Number | Name | Date |
|---|---|---|
| 1,066,735 | Kime | July 8, 1913 |
| 1,068,334 | Goodhue | July 22, 1913 |
| 2,432,059 | Zipser | Dec. 2, 1947 |
| 2,461,625 | Benson | Feb. 15, 1949 |
| 2,473,388 | Rambo | June 14, 1949 |

FOREIGN PATENTS

| Number | Country | Date |
|---|---|---|
| 351,475 | Great Britain | June 25, 1931 |